(12) United States Patent
Xiu et al.

(10) Patent No.: US 12,732,617 B2
(45) **Date of Patent: *Sep. 8, 2026**

(54) METHODS AND APPARATUSES FOR PREDICTION REFINEMENT WITH OPTICAL FLOW

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US); Shuiming Ye, San Diego, CA (US); Tsung-Chuan Ma, San Diego, CA (US); Hong-Jheng Jhu, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,667

(22) Filed: Jun. 27, 2024

(65) Prior Publication Data

US 2024/0348791 A1 Oct. 17, 2024

Related U.S. Application Data

(63) Continuation of application No. 17/510,328, filed on Oct. 25, 2021, now Pat. No. 12,052,426, which is a (Continued)

(51) Int. Cl.

*H04N 19/137* (2014.01)
*H04N 19/105* (2014.01)

(Continued)

(52) U.S. Cl.

CPC ......... *H04N 19/137* (2014.11); *H04N 19/105* (2014.11); *H04N 19/132* (2014.11); *H04N 19/176* (2014.11)

(58) Field of Classification Search

None

See application file for complete search history.

(56) References Cited

U.S. PATENT DOCUMENTS 11,695,950 B2 * 7/2023 Luo ...................... H04N 19/521 375/240.16
2012/0031477 A1 2/2012 Fogel et al.

(Continued)

FOREIGN PATENT DOCUMENTS

CN 1856106 A 11/2006
CN 101584210 A 11/2009

(Continued)

OTHER PUBLICATIONS

Bross, Benjamin et al., Versatile Video Coding (Draft 5), Joint Video Experts Team (JVET) of ITU-T SG 16 WP 3 and ISO/IEC JTC 1/SC 29/WVG 11, 14th Meeting: Geneva, CH, [Document: VET-N1001-v101, Mar. 27, 2019, (407p).

(Continued)

*Primary Examiner* — Talha M Nawaz
(74) *Attorney, Agent, or Firm* — Arch & Lake LLP

(57) ABSTRACT

Methods, apparatuses, and non-transitory computer-readable storage mediums are provided for encoding a video signal. A method may include obtain a first reference picture associated with a video block in a current picture within the video signal and a first motion vector (MV) from the video block in the current picture to a reference block in the first reference picture; obtain first prediction samples I(i,j) of the video block generated from the reference block in the first reference picture; control internal bit-depths of internal prediction refinement with optical flow (PROF) parameters;

(Continued)

obtain a prediction refinement value for the first prediction sample I(i,j); obtain second prediction samples I'(i,j) associated with a second MV and a corresponding prediction refinement value for a second prediction sample I'(i,j); and obtain a final prediction sample of the video block based on the first prediction sample I(i,j), the second prediction sample I'(i,j), and the prediction refinement values.

20 Claims, 10 Drawing Sheets

Related U.S. Application Data continuation of application No. PCT/US2020/030155, filed on Apr. 27, 2020.

(60) Provisional application No. 62/838,939, filed on Apr. 25, 2019.

(51) Int. Cl.
*H04N 19/132* (2014.01)
*H04N 19/176* (2014.01)

(56) References Cited

U.S. PATENT DOCUMENTS

| | | | | |
|---|---|---|---|---|
| 2014/0092968 | A1 | 4/2014 | Guillemot et al. | |
| 2015/0249825 | A1 | 9/2015 | Kim et al. | |
| 2016/0316217 | A1 | 10/2016 | Hatakeyama | |
| 2017/0150178 | A1 | 5/2017 | Nam et al. | |
| 2017/0238011 | A1* | 8/2017 | Pettersson | H04N 19/54 375/240.12 |
| 2018/0192072 | A1 | 7/2018 | Chen et al. | |
| 2018/0199057 | A1* | 7/2018 | Chuang | H04N 19/573 |
| 2018/0255298 | A1 | 9/2018 | Lee | |
| 2018/0262773 | A1* | 9/2018 | Chuang | H04N 19/577 |
| 2018/0270500 | A1 | 9/2018 | Li | |
| 2018/0376147 | A1 | 12/2018 | Iwamura et al. | |
| 2018/0376166 | A1 | 12/2018 | Chuang et al. | |
| 2019/0045214 | A1 | 2/2019 | Ikai et al. | |
| 2019/0313107 | A1* | 10/2019 | Park | H04N 19/18 |
| 2020/0221122 | A1* | 7/2020 | Ye | H04N 19/176 |
| 2020/0296405 | A1* | 9/2020 | Huang | H04N 19/137 |
| 2020/0382795 | A1* | 12/2020 | Zhang | H04N 19/117 |
| 2022/0264115 | A1* | 8/2022 | Li | H04N 19/182 |

FOREIGN PATENT DOCUMENTS

| | | | |
|---|---|---|---|
| CN | 101795409 | A | 8/2010 |
| CN | 106664416 | A | 5/2017 |
| CN | 106664423 | A | 5/2017 |
| CN | 107925775 | A | 4/2018 |
| CN | 108496367 | A | 9/2018 |
| CN | 109496430 | A | 3/2019 |
| EP | 3357241 | A1 | 8/2018 |
| JP | 2022523795 | A | 4/2022 |
| JP | 7269371 | B2 | 5/2023 |
| JP | 7559132 | B2 | 10/2024 |
| KR | 20180107761 | A | 10/2018 |
| KR | 20180119084 | A | 11/2018 |
| KR | 20190024553 | A | 3/2019 |
| WO | 2016056782 | A1 | 4/2016 |
| WO | 2017036399 | A1 | 3/2017 |
| WO | 2017195914 | A1 | 11/2017 |
| WO | 2018131832 | A1 | 5/2018 |
| WO | 2018113658 | A1 | 6/2018 |
| WO | 2018166357 | A1 | 9/2018 |
| WO | 2018237303 | A1 | 12/2018 |
| WO | 2019072371 | A1 | 4/2019 |
| WO | 2019010156 | A1 | 10/2019 |
| WO | 2020211867 | A1 | 10/2020 |

OTHER PUBLICATIONS

Yan-fei Shen et al. "High Efficiency Video Coding", Chinese Journal of Computer, vol. 36 No. 1 dated on Nov. 2013 (16p).

Yu-jiao Wang, "Study On Motion Blurred Video Images' Restoration", Xia'n University of Technology, Student No. 2140920003,dated on Jun. 2017 (58p).

Luo, et al., CE2-related: Prediction refinement whti optical flow for affine mode', Joint Video Experts Team (JVET) of ITU-T SG 61 WP 3and ISO/IEC JC 1/SC 29/WG 1, JVET-N0236-15, 14th Meeting: Geneva, CH, Mar. 19-27, 2019, (3p).

Yang, Haito, "Description of Core Experiment 4(CE4): Inter prediction", Joint Video Experts Team (JVET) of ITU-T SG 16 WP 3 and ISO/EC JTC 1/SC 29/WG11, JVET-N1024-v3, 14th Meeting: Geneva, CH, Mar. 19-27, 2019, (11p).

Supplementary EP Search Report of EP Application No. 20795945.3 dated Nov. 25, 2022, (4p).

Bross, Benjamin et al., "Versatile Video Coding (Draft 4)", Joint Video Experts Team (JVET) of ITU-T SG 16 WP 3 and ISO/EC JTC 1/SC 29/WG11, JVET-M1001-v-7, 13th Meeting: Marrakech, MA Jan. 9-18, 2019, (299p).

International Search Report of International Application No. PCT/US2020/030155 dated Jul. 30, 2020, (3p).

Luo, Jiancong (Daniel) et al., CE2-Related: Prediction refinement with optical flow for affine mode, Joint Video Experts Team (JVET) of ITU-T SG 16 WP 3 and ISO/IEC JTC 1/SC 29/WG 1, 14th Meeting: Geneva, CH [Document: JVET-No. 236-5], Mar. 27, 2019, (7p).

Xiaoyu Xiu et al., "CE4-related: Harmonization of BDOF and PROF", oint Video Experts Team (JVET) of ITU-T SG 16 WP 3 and ISO/IEC JTC 1/SC 29/WG 11, JVET-00593, 15th Meeting: Gothenburg, SE, Jul. 3-12, 2019, (5p).

EP Office Action of European Patent Application No. 20795945.3 dated Mar. 4, 2025, (7p).

Extended European Search Report of EP Application No. 26156559.2 dated Apr. 28, 2026, (11p).

Chen, Jianle et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11, JVET-Q2002-v3, 17th Meeting: Brussels, BE, Jan. 7-17, 2020, (36p).

Xiu, Xiaoyu et al., "CE4-related: Prediction sample padding unification for BDOF and PROF," Joint Video Experts Team (JVET) of ITU-T SG 16 WP 3 and ISO/IEC JTC 1/SC 29/WG 11, JVET-O0594, 15th Meeting: Gothenburg, SE, Jul. 3-12, 2019, (4p).

Yang, Haitao et al., "Description of Core Experiment 4 (CE4): Inter prediction," Joint Video Experts Team (JVET) of ITU-T SG 16 WP 3 and ISO/IEC JTC 1/SC 29/WG 11, JVET-N1024-v3, 14th Meeting: Geneva, CH, Mar. 19-27, 2019, (11p).

Bross, Benjamin, et al., "Versatile Video Coding (Draft 5)," Joint Video Experts Team (JVET) of ITU-T SG 16 WP 3 and ISO/IEC JTC 1/SC 29/WG 11, JVET-N1001-v2, 14th Meeting: Geneva, CH, Mar. 19-27, 2019, (20p).

* cited by examiner

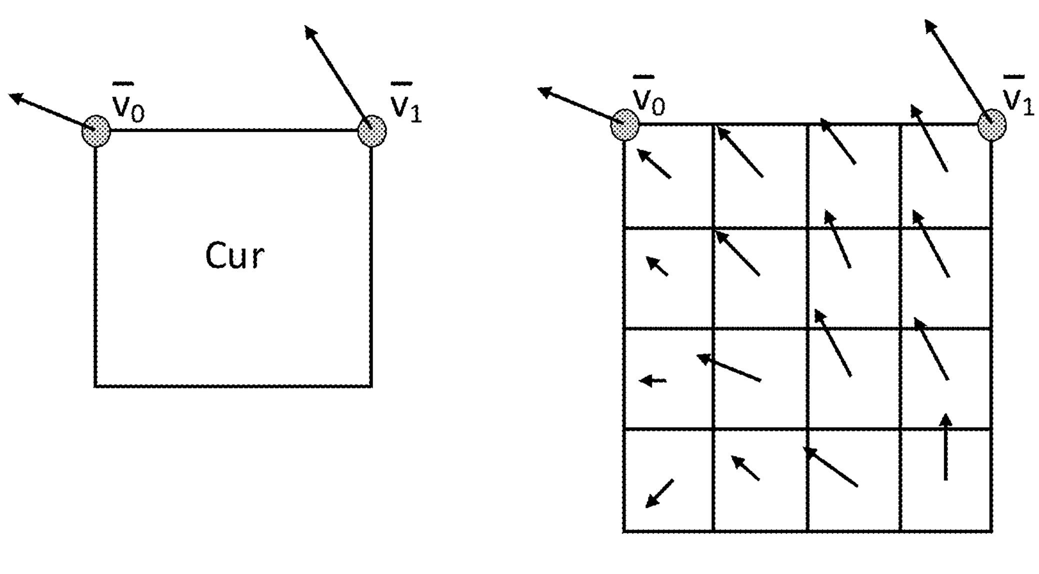
FIG. 5A
FIG. 5B
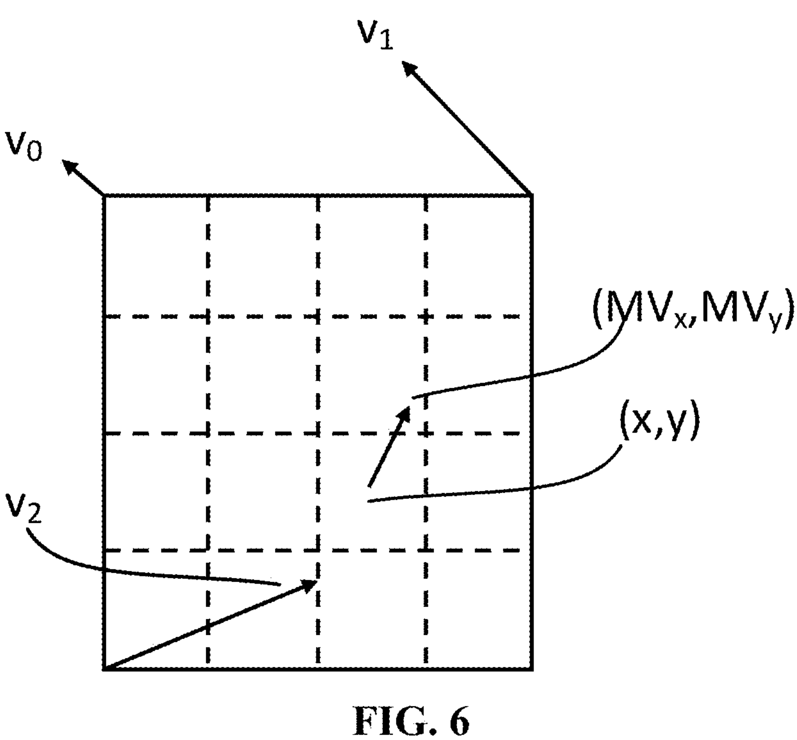
FIG. 6

800

L0 Motion Compensation 810

L1 Motion Compensation 820

BDOF 830

1300

T0 T1 T2 T3 T4

Parse/decode MV and fetch reference samples 1310: BLK0, BLK1, BLK2, BLK3, BLK4

Motion Compensation 1320: BLK0, BLK1, BLK2, BLK3

BDOF/PROF 1330: BLK0, BLK1, BLK2

METHODS AND APPARATUSES FOR PREDICTION REFINEMENT WITH OPTICAL FLOW

CROSS-REFERENCE TO RELATED APPLICATIONS

This application is a continuation of application Ser. No. 17/510,328 filed on Oct. 25, 2021, which is a continuation of PCT Application No. PCT/US2020/030155 filed on Apr. 27, 2020, which is based upon and claims priority to Provisional Application No. 62/838,939 filed on Apr. 25, 2019, the entire contents of which are incorporated herein by reference in their entireties for all purposes.

TECHNICAL FIELD

This disclosure is related to video coding and compression. More specifically, this disclosure relates to methods and apparatus on the two inter prediction tools that are investigated in the versatile video coding (VVC) standard, namely, prediction refinement with optical flow (PROF) and bi-directional optical flow (BDOF).

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for bit-depth representation of prediction refinement with optical flow.

According to a first aspect of the present disclosure, there is provided a method for encoding a video signal, including: obtaining a first reference picture associated with a video block in a current picture within the video signal and a first motion vector (MV) from the video block in the current picture to a reference block in the first reference picture, wherein the first reference picture includes multiple non-overlapped video blocks and at least one video block is associated with at least one MV; obtaining first prediction samples I(i,j) of the video block generated from the reference block in the first reference picture, wherein i and j represent a coordinate of one sample within the video block; controlling internal bit-depths of internal prediction refinement with optical flow (PROF) parameters, wherein the internal PROF parameters include a horizontal gradient value, a vertical gradient value, a horizontal motion difference, and a vertical motion difference derived for a first prediction sample I(i,j); obtaining a prediction refinement value for the first prediction sample I(i,j) based on the horizontal and vertical gradient values and the horizontal and vertical motion differences; obtaining second prediction samples I'(i,j) associated with a second MV and a corresponding prediction refinement value for a second prediction sample I'(i,j); and obtaining a final prediction sample of the video block based on the first prediction sample I(i,j), the second prediction sample I'(i,j), and the prediction refinement values.

According to a second aspect of the present disclosure, there is provided a computing device for encoding a video signal, including: one or more processors; a non-transitory computer-readable storage medium storing instructions executable by the one or more processors, wherein the one or more processors are configured to: obtain a first reference picture associated with a video block in a current picture within the video signal and a first motion vector (MV) from the video block in the current picture to a reference block in the first reference picture, wherein the first reference picture includes multiple non-overlapped video blocks and at least one video block is associated with at least one MV; obtain first prediction samples I(i,j) of the video block generated from the reference block in the first reference picture, wherein i and j represent a coordinate of one sample within the video block; control internal bit-depths of internal prediction refinement with optical flow (PROF) parameters, wherein the internal PROF parameters include a horizontal gradient value, a vertical gradient value, a horizontal motion difference, and a vertical motion difference derived for a first prediction sample I(i,j); obtain a prediction refinement value for the first prediction sample I(i,j) based on the horizontal and vertical gradient values and the horizontal and vertical motion differences; obtain second prediction samples I'(i,j) associated with a second MV and a corresponding prediction refinement value for a second prediction sample I'(i,j); and obtain a final prediction sample of the video block based on the first prediction sample I(i,j), the second prediction sample I'(i,j), and the prediction refinement values.

According to a third aspect of the present disclosure, there is provided a computing device for encoding a video signal, including: one or more processors; a non-transitory computer-readable storage medium storing instructions executable by the one or more processors, wherein the one or more processors are configured to: obtain a first reference picture associated with a video block in a current picture within the video signal and a first motion vector (MV) from the video block in the current picture to a reference block in the first reference picture, wherein the first reference picture includes multiple non-overlapped video blocks and at least one video block is associated with at least one MV; obtain first prediction samples I(i,j) of the video block generated from the reference block in the first reference picture, wherein i and j represent a coordinate of one sample within the video block; control internal bit-depths of internal prediction refinement with optical flow (PROF) parameters, wherein the internal PROF parameters include a horizontal gradient value, a vertical gradient value, a horizontal motion difference, and a vertical motion difference derived for a first prediction sample I(i,j); obtain a prediction refinement value for the first prediction sample I(i,j) based on the horizontal and vertical gradient values and the horizontal and vertical motion differences; obtain second prediction samples I'(i,j) associated with a second MV and a corresponding prediction refinement value for a second prediction sample I'(i,j); and obtain a final prediction sample of the video block based on the first prediction sample I(i,j), the second prediction sample I'(i,j), and the prediction refinement values.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5A is an illustration of an affine model, according to an example of the present disclosure.

FIG. 5B is an illustration of an affine model, according to an example of the present disclosure.

FIG. 6 is an illustration of an affine model, according to an example of the present disclosure.

DETAILED DESCRIPTION

Figure 1:
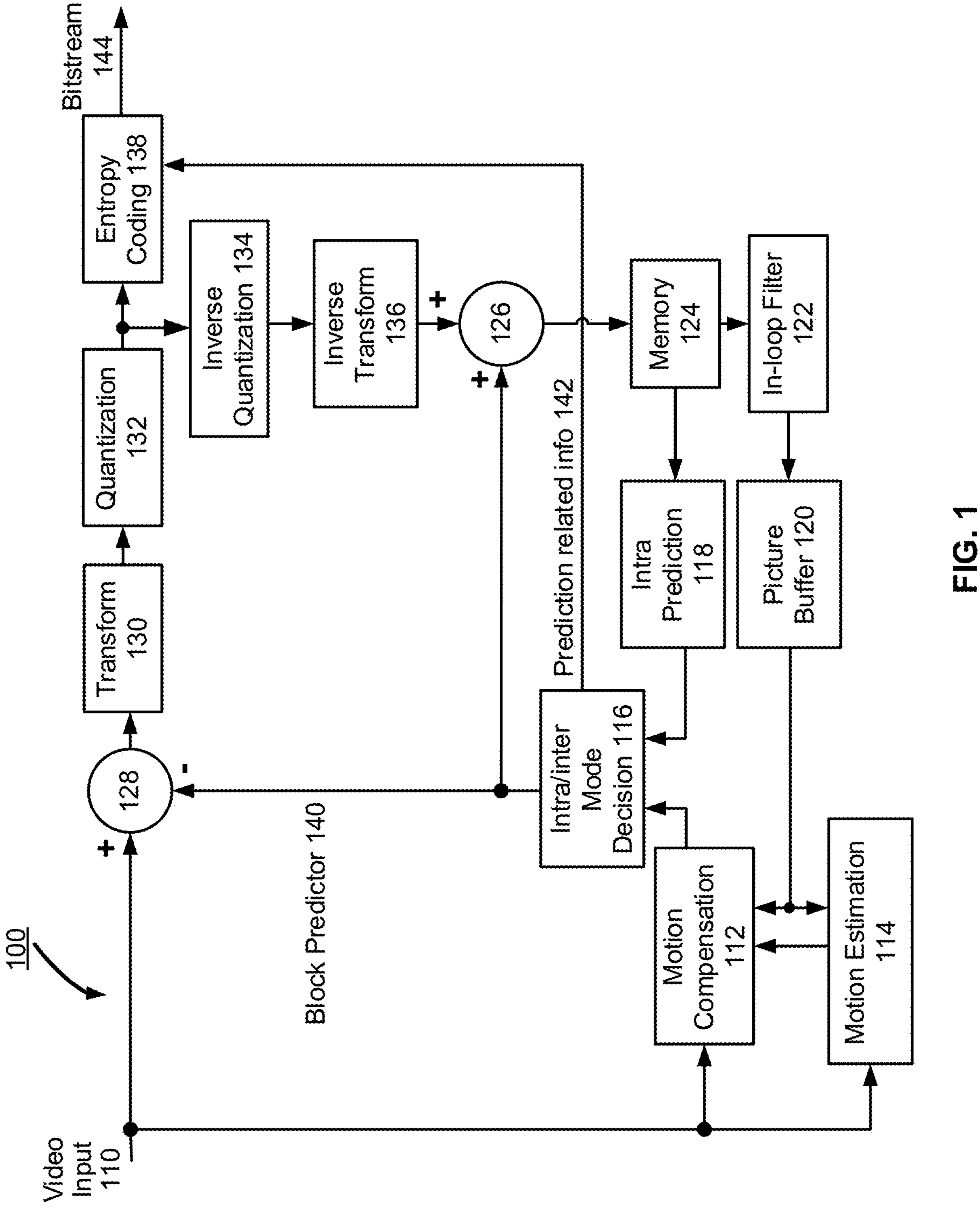
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. The Joint Video Exploration Team (JVET) was formed in October 2015 by ITU-T VECG and ISO/IEC MPEG to begin a significant study of advanced technologies that could enable substantial enhancement of coding efficiency. One reference software called the joint exploration model (JEM) was maintained by the JVET by integrating several additional coding tools on top of the HEVC test model (HM).

In October 2017, the joint call for proposals (CP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework. FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction Is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction Is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

For example, a deblocking filter is available in AVC, HEVC, as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated and may be included in the final standard.

These in-loop filter operations are optional. Performing these operations helps to improve coding efficiency and visual quality. They may also be turned off as a decision rendered by the encoder 100 to save computational complexity.

It should be noted that intra prediction Is usually based on unfiltered reconstructed pixels, while inter prediction Is based on filtered reconstructed pixels if these filter options are turned on by the encoder 100.

The input video signal is processed block by block (called coding units (CUs)). In VTM-1.0, a CU can be up to 128×128 pixels. However, different from the HEVC, which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E (described below), there are five splitting types, quaternary partitioning, horizontal binary partitioning, vertical binary partitioning, horizontal ternary partitioning, and vertical ternary partitioning.

Figures 3A, 3B, 3C:
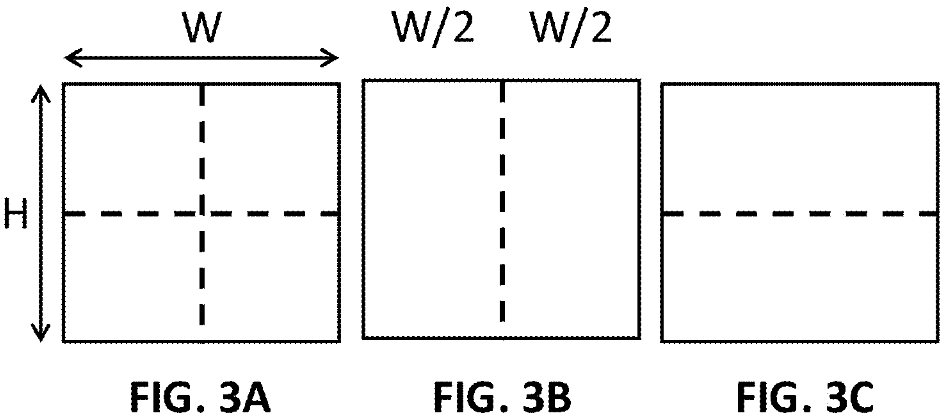
FIG. 3A is a diagram illustrating block partitions in a multi-type tree structure, according to an example of the present disclosure.
FIG. 3B is a diagram illustrating block partitions in a multi-type tree structure, according to an example of the present disclosure.
FIG. 3C is a diagram illustrating block partitions in a multi-type tree structure, according to an example of the present disclosure.

FIG. 3A shows a diagram illustrating a block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

Figures 3D, 3E:
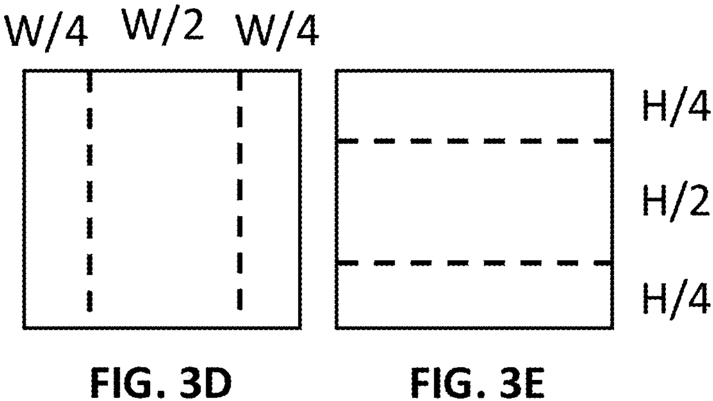
FIG. 3D is a diagram illustrating block partitions in a multi-type tree structure, according to an example of the present disclosure.
FIG. 3E is a diagram illustrating block partitions in a multi-type tree structure, according to an example of the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given CU is usually signaled by one or more MVs, which indicate the amount and the direction of motion between the current CU and its temporal reference. Also, if multiple reference pictures are supported, one reference picture index is additionally sent, which is used to identify from which reference picture in the reference picture storage the temporal prediction signal comes from. After spatial and/or temporal prediction, the mode decision block in the encoder chooses the best prediction mode, for example, based on the rate-distortion optimization method. The prediction block is then subtracted from the current video block, and the prediction residual is de-correlated using transform and quantized. The quantized residual coefficients are inverse quantized and inverse transformed to form the reconstructed residual, which is then added back to the prediction block to form the reconstructed signal of the CU. Further, in-loop filtering, such as deblocking filter, sample adaptive offset (SAO), and adaptive in-loop filter (ALF), may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
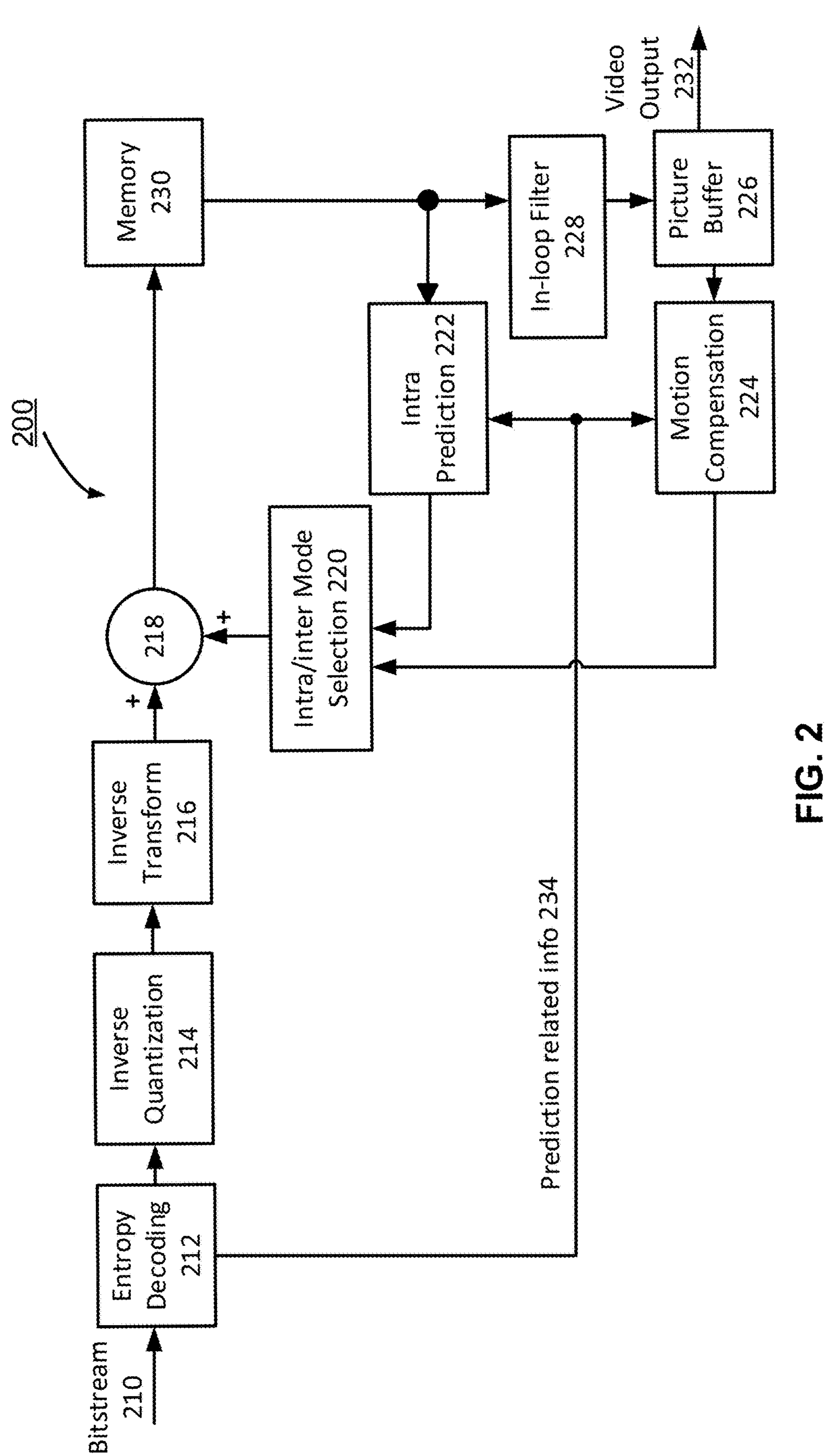
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels are obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

In FIG. 2, the video bit-stream is first entropy decoded at entropy decoding unit. The coding mode and prediction Information are sent to either the spatial prediction unit (if intra coded) or the temporal prediction unit (if inter-coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture storage. The reconstructed video in reference picture store is then sent out to drive a display device, as well as used to predict future video blocks.

In general, the basic inter prediction techniques that are applied in the VVC are kept the same as that of the HEVC except that several modules are further extended and/or enhanced. In particular, for all the preceding video standards, one coding block can only be associated with one single MV when the coding block is uni-predicted or two MVs when the coding block is bi-predicted. Because of such limitation of the conventional block-based motion compensation, small motion can still remain within the prediction samples after motion compensation, therefore negatively affecting the overall efficiency of motion compensation. To improve both the granularity and precision of the MVs, two sample-wise refinement methods based on optical flow, namely bi-directional optical flow (BDOF) and prediction refinement with optical flow (PROF) for affine mode, are currently investigated for the VVC standard. In the following, the main technical aspects of the two inter coding tools are briefly reviewed.

Bi-Directional Optical Flow

Figure 4:
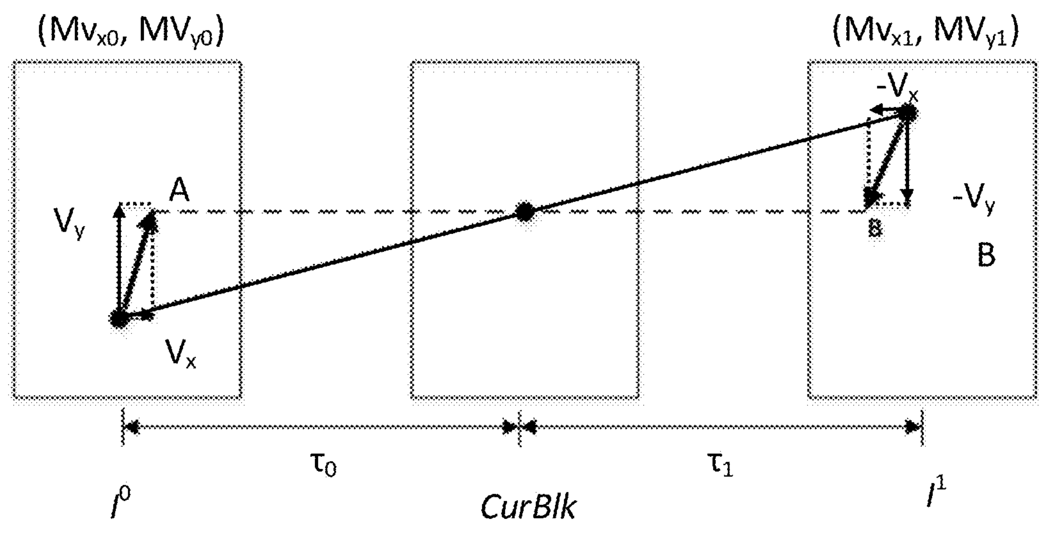
FIG. 4 is a diagram illustration of a bi-directional optical flow (BDOF) model, according to an example of the present disclosure.

In the VVC, BDOF is applied to refine the prediction samples of bi-predicted coding blocks. Specifically, as shown in FIG. 4, which shows an illustration of a BDOF, the BDOF is sample-wise motion refinement that is performed on top of the block-based motion-compensated predictions when bi-prediction Is used. The motion refinement $(v_x, v_y)$ of each 4×4 sub-block is calculated by minimizing the difference between L0 and L1 prediction samples after the BDOF is applied inside one 6×6 window Ω around the sub-block. Specifically, the value of $(v_x, v_y)$ is derived as $$v_x = S_1 > 0 ?\ \mathrm{clip3}\left(-th_{BDOF}, th_{BDOF}, -\left((S_3 \cdot 2^3) \gg \lfloor \log_2 S_1 \rfloor\right)\right) : 0 \tag{1}$$

$$v_y = S_5 > 0 ?\ \mathrm{clip3}\left(-th_{BDOF}, th_{BDOF}, -\left(\left(S_6 \cdot 2^3 - \left((v_x S_{2,m}) \ll n_{S_2} + v_x S_{2,s}\right)/2\right) \gg \lfloor \log_2 S_5 \rfloor\right)\right) : 0$$

where $\lfloor \cdot \rfloor$ is the floor function; clip3(min, max, x) is a function that clips a given value x inside the range of [min, max]; the symbol >> represents bitwise right shift operation; the symbol << represents bitwise left shift operation; $th_{BDOF}$ is the motion refinement threshold to prevent the propagated errors due to irregular local motion, which is equal to 1<<max(5, bit-depth-7), where bit-depth is the internal bit-depth. In (1), $S_{2,m}=S_2>>n_{S_2}$, $$S_{2,S} = S_2 \,\&\, (2^{n_{S_2}} - 1).$$

The values of $S_1$, $S_2$, $S_3$, $S_5$ and $S_6$ are calculated as $$S_1 = \sum_{(i,j)\in\Omega} \psi_x(i,j) \cdot \psi_x(i,j) \tag{2}$$

$$S_2 = \sum_{(i,j)\in\Omega} \psi_x(i,j) \cdot \psi_y(i,j)$$

$$S_3 = \sum_{(i,j)\in\Omega} \theta(i,j) \cdot \psi_x(i,j)$$

$$S_5 = \sum_{(i,j)\in\Omega} \psi_y(i,j) \cdot \psi_y(i,j)$$

$$S_6 = \sum_{(i,j)\in\Omega} \theta(i,j) \cdot \psi_y(i,j)$$

-continued where $$\psi_x(i,j)=\left(\frac{\partial I^{(1)}}{\partial x}(i,j)+\frac{\partial I^{(0)}}{\partial x}(i,j)\right)\gg\max(1,\text{bit-depth}-11) \quad (3)$$

$$\psi_y(i,j)=\left(\frac{\partial I^{(1)}}{\partial y}(i,j)+\frac{\partial I^{(0)}}{\partial y}(i,j)\right)\gg\max(1,\text{bit-depth}-11)$$

$$\theta(i,j)=\left(I^{(1)}(i,j)\gg\max(4,\text{bit-depth}-8)\right)-\left(I^{(0)}(i,j)\gg\max(4,\text{bit-depth}-8)\right)$$

where $I^{(k)}(i,j)$ are the sample value at coordinate (i,j) of the prediction signal in list k, k=0, 1, which are generated at intermediate-high precision (i.e., 16-bit);

$$\frac{\partial I^{(k)}}{\partial x}(i,j) \text{ and } \frac{\partial I^{(k)}}{\partial y}(i,j)$$

are the horizontal and vertical gradients of the sample that are obtained by directly calculating the difference between its two neighboring samples, i.e., $$\frac{\partial I^{(k)}}{\partial x}(i,j)=\left(I^{(k)}(i+1,j)-I^{(k)}(i-1,j)\right)\gg\max(6,\text{bit-depth}-6) \quad (4)$$

$$\frac{\partial I^{(k)}}{\partial y}(i,j)=\left(I^{(k)}(i,j+1)-I^{(k)}(i,j-1)\right)\gg\max(6,\text{bit-depth}-6)$$

Based on the motion refinement derived in (1), the final bi-prediction samples of the CU are calculated by interpolating the L0/L1 prediction samples along the motion trajectory based on the optical flow model, as indicated by $$pred_{BDOF}(x,y)=\left(I^{(0)}(x,y)+I^{(1)}(x,y)+b+o_{offset}\right)\gg\text{shift} \quad (5)$$

$$b=rnd\left(\left(v_x\left(\frac{\partial I^{(1)}(x,y)}{\partial x}-\frac{\partial I^{(0)}(x,y)}{\partial x}\right)\right)/2\right)+rnd\left(\left(v_y\left(\frac{\partial I^{(1)}(x,y)}{\partial y}-\frac{\partial I^{(0)}(x,y)}{\partial y}\right)\right)/2\right)$$

where shift and $o_{offset}$ are the right shift value and the offset value that are applied to combine the L0 and L1 prediction signals for bi-prediction, which are equal to 15−BD and 1<<(14−BD)+2·(1<<13), respectively. Based on the above bit-depth control method, the maximum bit-depth of the intermediate parameters of the whole BDOF process does not exceed 32-bit, and the largest input to the multiplication is within 15-bit, i.e., one 15-bit multiplier is sufficient for BDOF implementations.

Affine Mode

In HEVC, only the translation motion model is applied for motion compensated prediction. While in the real world, there are many kinds of motion, e.g., zoom in/out, rotation, perspective motions, and other irregular motions. In the VVC, affine motion compensated prediction Is applied by signaling one flag for each inter coding block to indicate whether the translation motion or the affine motion model is applied for inter prediction. In the current VVC design, two affine modes, including 4-parameter affine mode and 6-parameter affine mode, are supported for one affine coding block.

The 4-parameter affine model has the following parameters: two parameters for translation movement in horizontal and vertical directions, respectively, one parameter for zoom motion and one parameter for rotation motion for both directions. The horizontal zoom parameter is equal to the vertical zoom parameter. The horizontal rotation parameter is equal to the vertical rotation parameter. To achieve a better accommodation of the MVs and affine parameter, in the VVC, those affine parameters are translated into two MVs (which are also called control point motion vector (CPMV)) located at the top-left corner and top-right corner of a current block. As shown in FIGS. 5A and 5B, the affine motion field of the block is described by two control point MVs ($V_0$, $V_1$).

FIG. 5A shows an illustration of a 4-parameter affine model. FIG. 5B shows an illustration of a 4-parameter affine model. Based on the control point motion, the motion field ($v_x$, $v_y$) of one affine coded block is described as $$v_x=\frac{(v_{1x}-v_{0x})}{w}x-\frac{(v_{1y}-v_{0y})}{w}y+v_{0x} \quad (6)$$

$$v_y=\frac{(v_{1y}-v_{0y})}{w}x+\frac{(v_{1x}-v_{0x})}{w}y+v_{0y}$$

The 6-parameter affine mode has the following parameters: two parameters for translation movement in horizontal and vertical directions, respectively, one parameter for zoom motion and one parameter for rotation motion in a horizontal direction, one parameter for zoom motion and one parameter for rotation motion in a vertical direction. The 6-parameter affine motion model is coded with three MVs at three CPMVs.

FIG. 6 shows an illustration of a 6-parameter affine model. As shown in FIG. 6, three control points of one 6-parameter affine block are located at the top-left, top-right, and bottom left corner of the block. The motion at the top-left control point is related to translation motion, and the motion at the top-right control point is related to rotation and zoom motion in a horizontal direction, and the motion at the bottom-left control point is related to rotation and zoom motion in a vertical direction. Compared to the 4-parameter affine motion model, the rotation and zoom motion in a horizontal direction of the 6-parameter may not be the same as those motion in a vertical direction. Assuming ($V_0$, $V_1$, $V_2$) are the MVs of the top-left, top-right, and bottom-left corners of the current block in FIG. 6, the MV of each sub-block ($v_x$, $v_y$) is derived using three MVs at control points as:

$$v_x=v_{0x}+(v_{1x}-v_{0x})*\frac{x}{w}+(v_{2x}-v_{0x})*\frac{y}{h} \quad (7)$$

$$v_y=v_{0y}+(v_{1y}-v_{0y})*\frac{x}{w}+(v_{2y}-v_{0y})*\frac{y}{h}$$

PROF for Affine Mode

To improve affine motion compensation precision, the PROF is currently investigated in the current VVC, which refines the sub-block based affine motion compensation based on the optical flow model. Specifically, after performing the sub-block-based affine motion compensation, luma prediction sample of one affine block is modified by one sample refinement value derived based on the optical flow equation. In details, the operations of the PROF can be summarized as the following four steps:

Step one: The sub-block-based affine motion compensation is performed to generate sub-block prediction I(i,j)

using the sub-block MVs as derived in (6) for the 4-parameter affine model and (7) for the 6-parameter affine model.

Step two: The spatial gradients $g_x(i,j)$ and $g_y(i,j)$ of each prediction samples are calculated as $$g_x(i, j) = (I(i+1, j) - I(i-1, j)) \gg (\max(2, 14 - \text{bit-depth}) - 4) \tag{8}$$
$$g_y(i, j) = (I(i, j+1) - I(i, j-1)) \gg (\max(2, 14 - \text{bit-depth}) - 4)$$

To calculate the gradients, one additional row/column of prediction samples need to be generated on each side of one sub-block. To reduce the memory bandwidth and complexity, the samples on the extended borders are copied from the nearest integer pixel position in the reference picture to avoid additional interpolation processes.

Step three: The luma prediction refinement value is calculated by $$\Delta I(i, j) = g_x(i, j) * \Delta v_x(i, j) + g_y(i, j) * \Delta v_y(i, j) \tag{9}$$

where the $\Delta v(i,j)$ is the difference between pixel MV computed for sample location (i,j), denoted by $v(i,j)$, and the sub-block MV of the sub-block where the pixel (i,j) locates at.

Step four: In the current PROF design, after adding the prediction refinement to the original prediction sample, one clipping operation is performed to clip the value of the refined prediction sample to be within 15-bit, i.e., $$I^r(i, j) = I(i, j) + \Delta I(i, j)$$
$$I^r(i, j) = \text{clip3}(-2^{14}, 2^{14} - 1, I^r(i, j))$$

where I(i,j) and $I^r(i,j)$ are the original and refined prediction samples at a location (i,j), respectively.

Figures 7, 8:
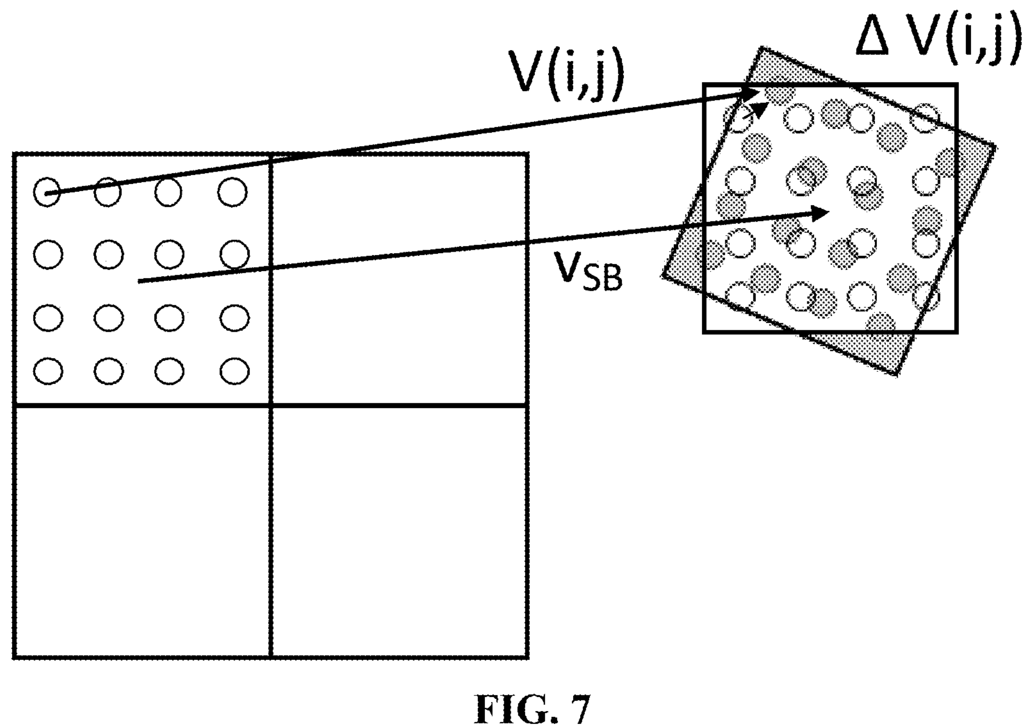
FIG. 7 is an illustration of a prediction refinement with optical flow (PROF), according to an example of the present disclosure.
FIG. 8 is a workflow of a BDOF, according to an example of the present disclosure.

FIG. 7 shows an illustration of a PROF process for an affine mode.

Because the affine model parameters and the pixel location relative to the sub-block center are not changed from sub-block to sub-block, $\Delta v(i,j)$ can be calculated for the first sub-block, and reused for other sub-blocks in the same CU. Let $\Delta x$ and $\Delta y$ be the horizontal and vertical offset from the sample location (i,j) to the center of the sub-block that the sample belongs to, $\Delta v(i,j)$ can be derived as $$\Delta v_x(i, j) = c * \Delta x + d * \Delta y \tag{10}$$
$$\Delta v_y(i, j) = e * \Delta x + f * \Delta y$$

Based on the affine sub-block MV derivation equations (6) and (7), the MV difference $\Delta v(i,j)$ can be derived. Specifically, for 4-parameter affine model, $$\begin{cases} c = f = \dfrac{v_{1x} - v_{0x}}{w} \\ e = -d = \dfrac{v_{1y} - v_{0y}}{w} \end{cases}$$

For the 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right, and bottom-left control point MVs of the current coding block, w and h are the width and height of the block. In the existing PROF design, the MV difference $\Delta v_x$ and $\Delta v_y$ are always derived at the precision of 1/32-pel.

Coding Efficiency of Affine Mode

Although the PROF can enhance the coding efficiency of affine mode, its design can still be further improved. Especially, given the fact that both PROF and BDOF are built upon the optical flow concept, it is highly desirable to harmonize the designs of the PROF and the BDOF as much as possible such that the PROF can maximally leverage the existing logics of the BDOF to facilitate hardware implementations. Based on such consideration, the following problems on the interaction between the current PROF and BDOF designs are identified in this disclosure.

As described in the section "PROF for affine mode," in equation (8), the precision of gradients is determined based on the internal bit-depth. On the other hand, the MV difference, i.e., $\Delta v_x$ and $\Delta v_y$, are always derived at the precision of 1/32-pel. Correspondingly, based on the equation (9), the precision of the derived PROF refinement is dependent on the internal bit-depth. However, similar to the BDOF, the PROF is applied on top of the prediction sample values at intermediate-high bit-depth (i.e., 16-bit) in order to keep higher PROF derivation precision. Therefore, regardless of the internal coding bit-depth, the precision of the prediction refinements derived by the PROF should match that of the intermediate prediction samples, i.e., 16-bit. In other words, the representation bit-depths of the MV difference and gradients in the existing PROF design are not perfectly matched to derive accurate prediction refinements relative to the prediction sample precision (i.e., 16-bit). Meanwhile, based on the comparison of equations (1), (4), and (8), the existing PROF and BDOF use different precisions to represent the sample gradients and the MV difference. As pointed out earlier, such a non-unified design is undesirable for hardware because the existing BDOF logic cannot be reused.

As discussed in the section "PROF for affine mode," when one current affine block is bi-predicted, the PROF is applied to the prediction samples in list L0 and L1 separately; then, the enhanced L0 and L1 prediction signals are averaged to generate the final bi-prediction signal. On the contrary, instead of separately deriving the PROF refinement for each prediction direction, the BDOF derives the prediction refinement once, which is then applied to enhance the combined L0 and L1 prediction signal.

Figure 9:
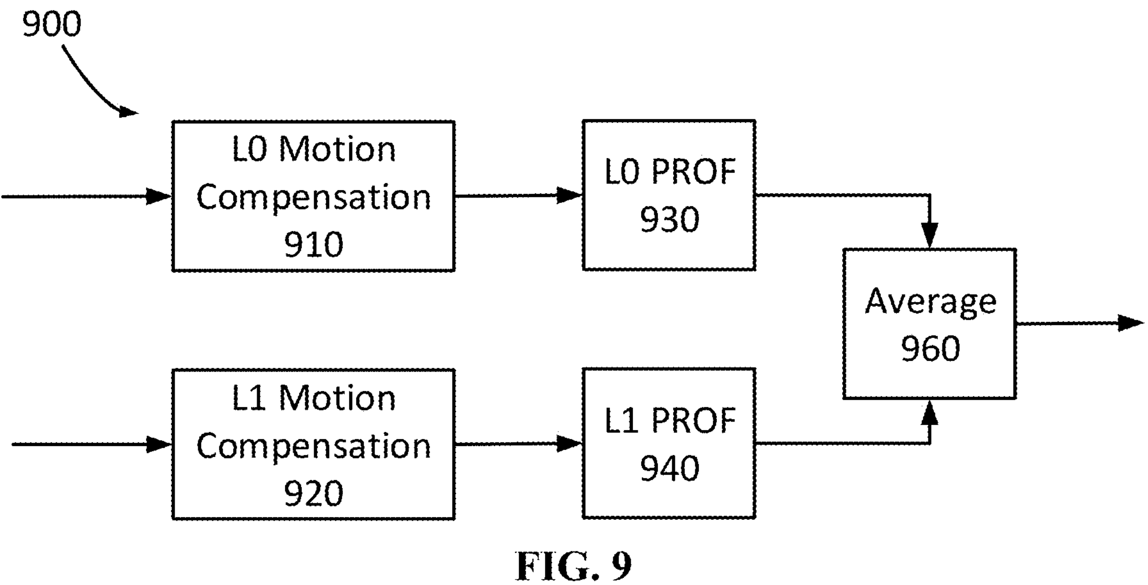
FIG. 9 is a workflow of a PROF, according to an example of the present disclosure.

FIGS. 8 and 9 (described below) compare the workflow of the current BDOF and the PROF for bi-prediction. In practical codec hardware pipeline design, it usually assigns different major encoding/decoding modules to each pipeline stage such that more coding blocks can be processed in parallel. However, due to the difference between the BDOF and PROF workflows, this may lead to difficulty to have one same pipeline design that can be shared by the BDOF and the PROF, which is unfriendly for practical codec implementation.

FIG. 8 shows the workflow of a BDOF. Workflow 800 includes L0 motion compensation 810, L1 motion compensation 820, and BDOF 830. L0 motion compensation 810, for example, can be a list of motion compensation samples from a previous reference picture. The previous reference picture is a reference picture previous from the current picture in the video block. L1 motion compensation 820, for example, can be a list of motion compensation samples from the next reference picture. The next reference picture is a reference picture after the current picture in the video block. BDOF 830 intakes motion compensation samples from L1 Motion Compensation 810 and L1 Motion Compensation 820 and output prediction samples, as described with regards to FIG. 4 above.

FIG. 9 shows a workflow of an existing PROF. Workflow 900 includes L0 motion compensation 910, L1 motion compensation 920, L0 PROF 930, L1 PROF 940, and average 960. L0 motion compensation 910, for example, can be a list of motion compensation samples from a previous reference picture. The previous reference picture is a reference picture previous from the current picture in the video block. L1 motion compensation 920, for example, can be a list of motion compensation samples from the next reference picture. The next reference picture is a reference picture after the current picture in the video block. L0 PROF 930 intakes the L0 motion compensation samples from L0 Motion Compensation 910 and outputs motion refinement values, as described with regards to FIG. 7 above. L1 PROF 940 intakes the L1 motion compensation samples from L1 Motion Compensation 920 and outputs motion refinement values, as described with regards to FIG. 7 above. Average 960 averages the motion refinement value outputs of L0 PROF 930 and L1 PROF 940.

For both the BDOF and the PROF, the gradients need to be calculated for each sample inside the current coding block, which requires generating one additional row/column of prediction samples on each side of the block. To avoid the additional computational complexity of sample interpolation, the prediction samples in the extended region around the block are directly copied from the reference samples at integer position (i.e., without interpolation). However, according to the existing design, the integer samples at different locations are selected to generate the gradient values of the BDOF and the PROF. Specifically, for the BDOF, the integer reference sample that is located left to the prediction sample (for horizontal gradients) and above the prediction sample (for vertical gradients) are used; for the PROF, the integer reference sample that is closest to the prediction sample is used for gradient calculations. Similar to the bit-depth representation problem, such a non-unified gradient calculation method is also undesirable for hardware codec implementations.

As pointed out earlier, the motivation of the PROF is to compensate for the small MV difference between the MV of each sample and the subblock MV that is derived at the center of the subblock that the sample belongs to. According to the current PROF design, the PROF is always invoked when one coding block is predicted by the affine mode. However, as indicated in equations (6) and (7), the subblock MVs of one affine block is derived from the control-point MVs. Therefore, when the difference between the control-point MVs is relatively small, the MVs at each sample position should be consistent. In such a case, because the benefit of applying the PROF could be very limited, it may not be worth performing PROF when considering the performance/complexity tradeoff.

Improving the Efficiency of Affine Mode Using PROF

In this disclosure, methods are provided to improve and simplify the existing PROF design to facilitate hardware codec implementations. Particularly, special attention is made to harmonize the designs of the BDOF and the PROF in order to maximally share the existing BDOF logics with the PROF. In general, the main aspects of the proposed technologies in this disclosure are summarized as follows.

Figure 10:
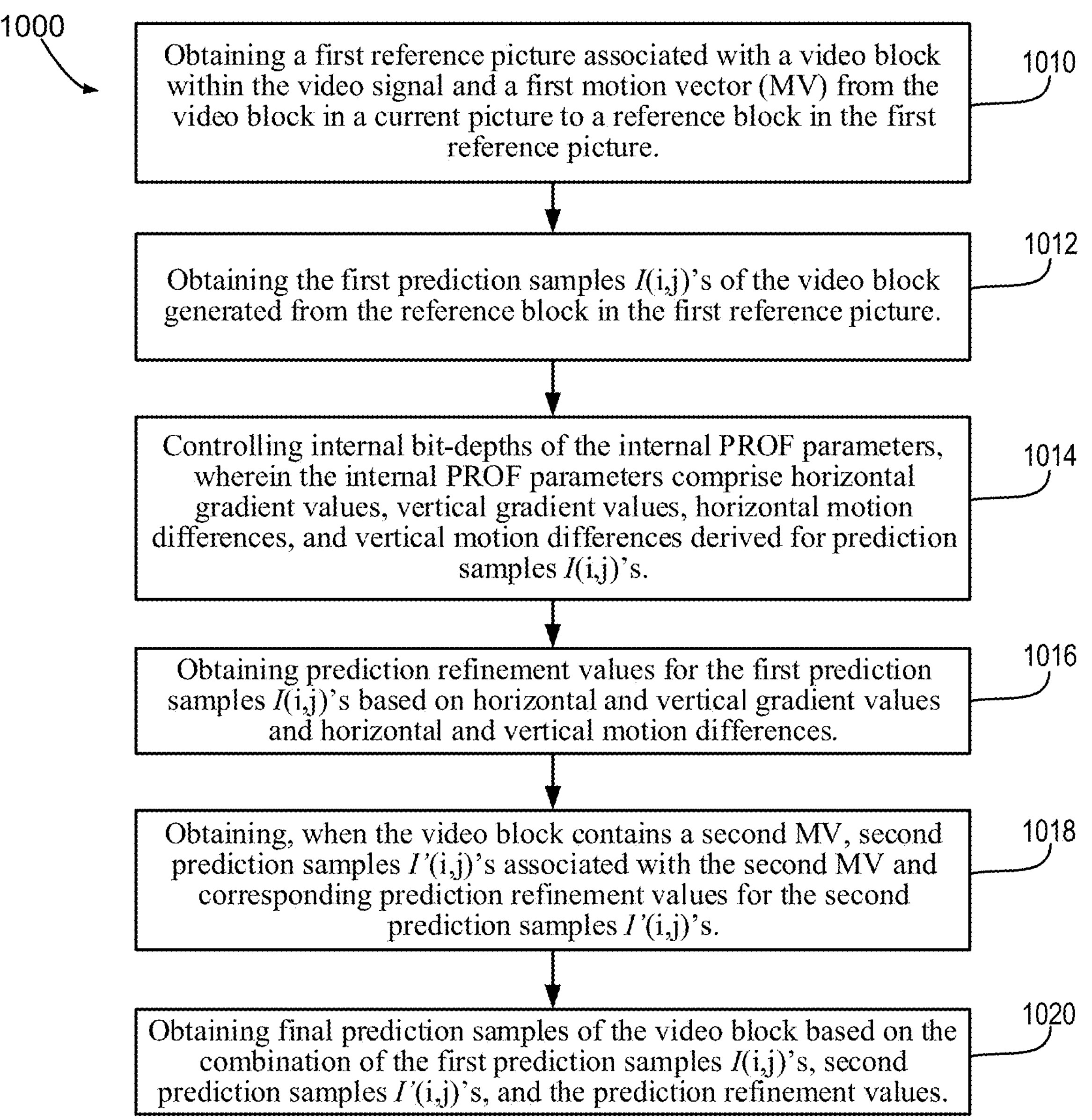
FIG. 10 is a bit-depth representation method of PROF, according to the present disclosure.

FIG. 10 shows a bit-depth representation method of PROF for decoding a video signal in accordance with the present disclosure.

In step 1010, obtaining a first reference picture associated with a video block within the video signal and a first MV from the video block in a current picture to a reference block in the first reference picture. The first reference picture includes multiple non-overlapped video blocks and at least one video block is associated with at least one MV. For example, reference pictures may be video pictures neighboring the current picture being encoded.

In step 1012, obtaining the first prediction samples I(i,j)'s of the video block generated from the reference block in the first reference picture. The i and j may represent a coordinate of one sample with the video block. For example, the prediction samples I(i,j) may be a prediction sample using a MV in the L0 list of the previous reference picture in display order.

In step 1014, controlling internal bit-depths of the internal PROF parameters. The internal PROF parameters include horizontal gradient values, vertical gradient values, horizontal motion differences, and vertical motion differences derived for prediction samples I(i,j)'s.

In step 1016, obtaining prediction refinement values for the first prediction samples I(i,j)'s based on horizontal and vertical gradient values and horizontal and vertical motion differences.

In step 1018, obtaining, when the video block contains a second MV, second prediction samples I'(i,j)'s associated with the second MV and corresponding prediction refinement values for the second prediction samples I'(i,j)'s.

In step 1020, obtaining final prediction samples of the video block based on the combination of the first prediction samples I(i,j)'s, second prediction samples I'(i,j)'s, and the prediction refinement values.

First, to improve the coding efficiency of the PROF while achieving one more unified design, one method is proposed to unify the representation bit-depth of the sample gradients and the MV difference that are used by the BDOF and the PROF.

Second, to facilitate hardware pipeline design, it is proposed to harmonize the workflow of the PROF with that of the BDOF for bi-prediction. Specifically, unlike the existing PROF that derives the prediction refinements separately for L0 and L1, the proposed method derives the prediction refinement once which is applied to the combined L0 and L1 prediction signal.

Third, two methods are proposed to harmonize the derivation of the integer reference samples to calculate the gradient values that are used by the BDOF and the PROF.

Fourth, to reduce the computational complexity, early termination methods are proposed to adaptively disable the PROF process for affine coding blocks when certain conditions are satisfied.

Improved Bit-Depth Representation Design of PROF Gradients and MV Difference

As analyzed in Section "Improving the efficiency of Affine mode using PROF," the representation bit-depths of the MV difference and the sample gradients in the current PROF are not aligned to derive accurate prediction refinements. Moreover, the representation bit-depth of the sample gradients and the MV difference is inconsistent between the BDOF and the PROF, which is unfriendly for hardware. In this section, one improved bit-depth representation method is proposed by extending the bit-depth representation method of the BDOF to the PROF. Specifically, in the proposed method, the horizontal and vertical gradients at each sample position are calculated as $$g_x(i,j) = (I(i+1,j) - I(i-1,j)) \gg \max(6, \text{bit-depth} - 6) \quad (11)$$
$$g_y(i,j) = (I(i,j+1) - I(i,j-1)) \gg \max(6, \text{bit-depth} - 6)$$

Additionally, assuming $\Delta x$ and $\Delta y$ be the horizontal and vertical offset represented at ¼-pel accuracy from one sample location to the center of the sub-block that the sample belongs to, the corresponding PROF MV difference $\Delta v(x, y)$ at the sample position is derived as $$\Delta v_x(i,j) = (c*\Delta x + d*\Delta y) \gg (13 - dMvBits) \quad (12)$$
$$\Delta v_y(i,j) = (e*\Delta x + f*\Delta y) \gg (13 - dMvBits)$$

where dMvBits is the bit-depth of the gradient values that are used by the BDOF process, i.e., dMvBits=max(5, (bit-depth−7))+1. In equations (11) and (12), c, d, e and f are affine parameters which are derived based on the affine control-point MVs. Specifically, for the 4-parameter affine model, $$\begin{cases} c = f = \frac{v_{1x} - v_{0x}}{w} \\ e = -d = \frac{v_{1y} - v_{0y}}{w} \end{cases}$$

For the 6-parameter affine model, $$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases}$$

where $(v_{0x}, v_{0y})$, $(v_{1x}, v_{1y})$, $(v_{2x}, v_{2y})$ are the top-left, top-right, and bottom-left control point MVs of the current coding block, which are represented in 1/16-pel precision, and w and h are the width and height of the block.

Harmonized Workflows of the BDOF and the PROF for Bi-Prediction

As discussed earlier, when one affine coding block is bi-predicted, the current PROF is applied in a unilateral manner. More specifically, the PROF sample refinements are separately derived and applied to the prediction samples in list L0 and L1. After that, the refined prediction signals, respectively from list L0 and L1, are averaged to generate the final bi-prediction signal of the block. This is in contrast to the BDOF design, where the sample refinements are derived and applied to the bi-prediction signal. Such that the difference between the bi-prediction workflows of the BDOF and the PROF may be unfriendly to practical codec pipeline design.

Figure 11:
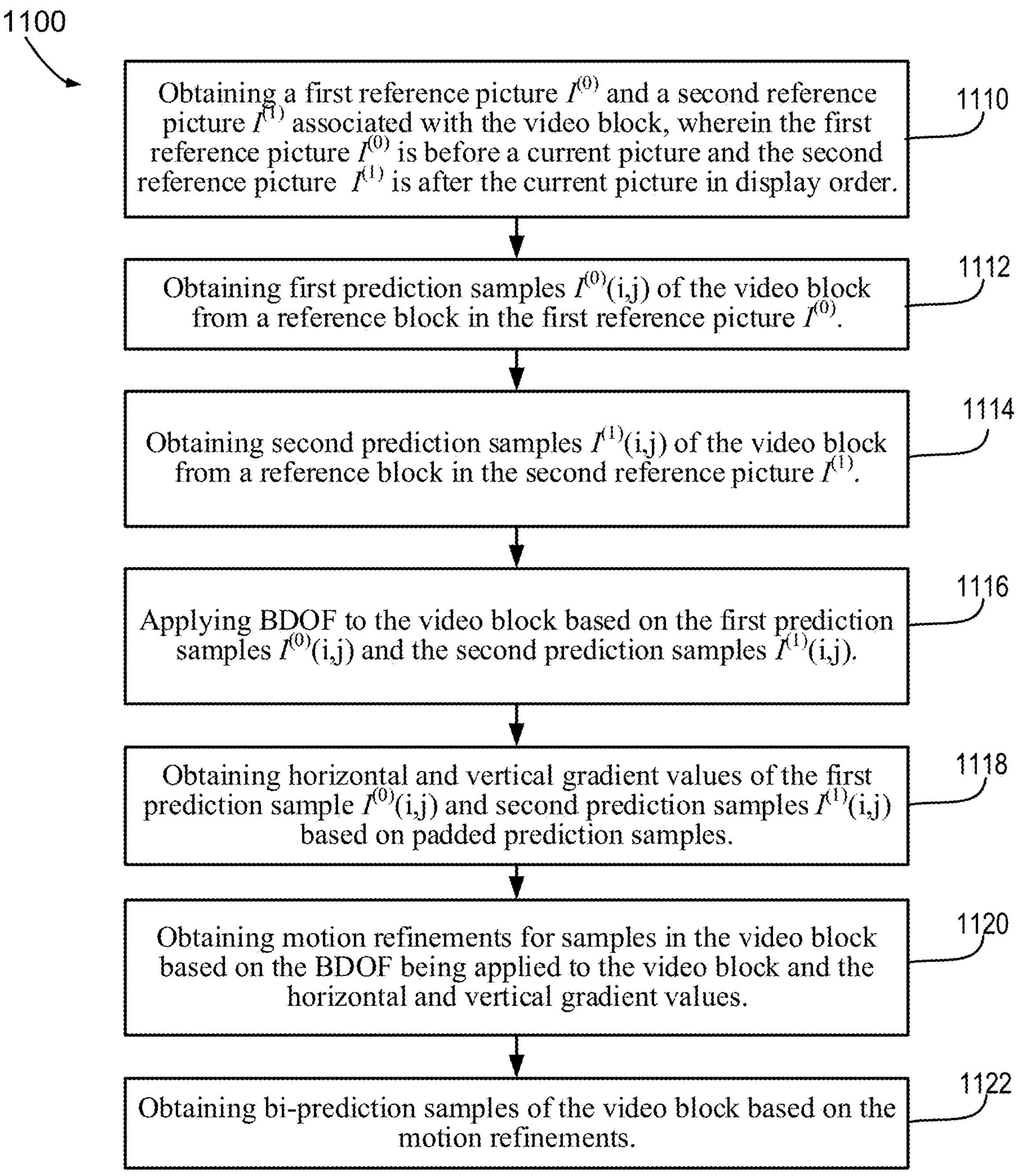
FIG. 11 is a bit-depth representation method of BDOF, according to the present disclosure.

FIG. 11 shows a bit-depth representation method of BDOF for decoding a video signal in accordance with the present disclosure.

In step 1110, obtaining a first reference picture $I^{(0)}$ and a second reference picture $I^{(1)}$ associated with a video block. The first reference picture $I^{(0)}$ is before a current picture and the second reference picture $I^{(1)}$ is after the current picture in display order. For example, reference pictures may be video pictures neighboring the current picture being encoded.

In step 1112, obtaining first prediction samples $I^{(0)}(i,j)$ of the video block from a reference block in the first reference picture $I^{(0)}$. The i and j may represent a coordinate of one sample with the current picture.

In step 1114, obtaining second prediction samples $I^{(1)}(i,j)$ of the video block from a reference block in the second reference picture $I^{(1)}$.

In step 1116, applying BDOF to the video block based on the first prediction samples $I^{(0)}(i,j)$ and the second prediction samples $I^{(1)}(i,j)$.

In step 1118, obtaining horizontal and vertical gradient values of the first prediction sample $I^{(0)}(i,j)$ and second prediction samples $I^{(1)}(i,j)$ based on padded prediction samples.

In step 1120, obtaining motion refinements for samples in the video block based on the BDOF being applied to the video block and the horizontal and vertical gradient values.

In step 1122, obtaining bi-prediction samples of the video block based on the motion refinements.

To facilitate hardware pipeline design, one simplification method, according to the current disclosure, is to modify the bi-prediction process of the PROF such that the workflows of the two prediction refinement methods are harmonized. Specifically, instead of separately applying the refinement for each prediction direction, the proposed PROF method derives the prediction refinements once based on the control-point MVs of list L0 and L1; the derived prediction refinements are then applied to the combined L0 and L1 prediction signal to enhance the quality. Specifically, based on the MV difference as derived in equation (12), the final bi-prediction samples of one affine coding block are calculated by the proposed method as $$pred_{PROF}(i,j) = \left(I^{(0)}(i,j) + I^{(1)}(i,j) + \Delta I(i,j) + o_{offset}\right) \gg \text{shift} \quad (13)$$
$$\Delta I(i,j) = (g_x(i,j)*\Delta v_x(i,j) + g_y(i,j)*\Delta v_y(i,j) + 1) \gg 1$$
$$I^r(i,j) = I(i,j) + \Delta I(i,j)$$

where shift and $o_{offset}$ are the right shift value and the offset value that are applied to combine the L0 and L1 prediction signals for bi-prediction, which are equal to (15−bit-depth) and 1<<(14−bit-depth)+(2>>13), respectively. Moreover, as shown in equation (13), the clipping operation in the existing PROF design (as shown in equation (9)) is removed in the proposed method.

Figures 12, 13:
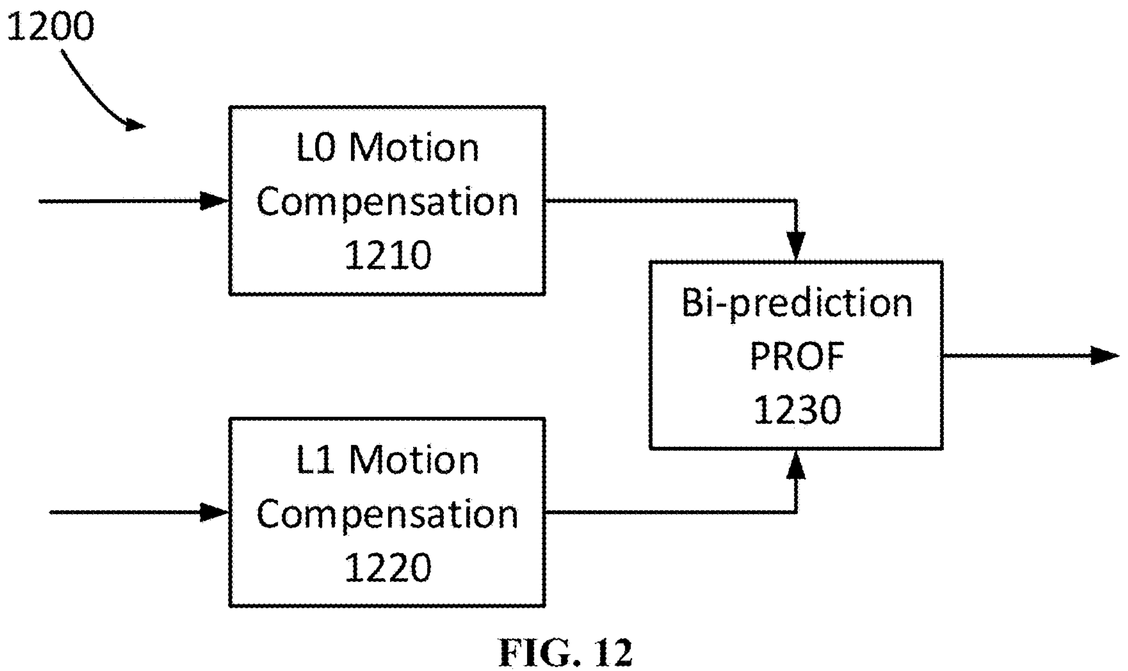
FIG. 12 is an illustration of a workflow of a PROF for bi-prediction, according to an example of the present disclosure.
FIG. 13 is an illustration of the pipeline stages of a BDOF and a PROF process, according to the present disclosure.

FIG. 12 shows an illustration of a PROF process when the proposed bi-prediction PROF method is applied. PROF process 1200 includes L0 motion compensation 1210, L1 motion compensation 1220, and bi-prediction PROF 1230.

L0 motion compensation 1210, for example, can be a list of motion compensation samples from a previous reference picture. The previous reference picture is a reference picture previous from the current picture in the video block. L1 motion compensation 1220, for example, can be a list of motion compensation samples from the next reference picture. The next reference picture is a reference picture after the current picture in the video block. Bi-prediction PROF 1230 intakes motion compensation samples from L1 Motion Compensation 1210 and L1 Motion Compensation 1220 and output bi-prediction samples, as described above.

FIG. 13 shows an illustration of an example pipeline stage when both the BDOF and the proposed PROF are applied. FIG. 13 demonstrates the potential benefit of the proposed method for hardware pipeline design. Pipeline stage 1300 includes parse/decode MV and fetch reference samples 1310, motion compensation 1320, BDOF/PROF 1330. The Pipeline stage 1300 will encode video blocks BLK0, BKL1, BKL2, BKL3, and BLK4. Each video block will begin in parse/decode MV and fetch reference samples 1310 and move to motion compensation 1320 and then motion compensation 1320, BDOF/PROF 1330, sequentially. This means that BLK0 will not begin in the pipeline stage 1300 process until BLK0 moves onto Motion Compensation 1320. The same for all the stages and video blocks as time goes from T0 to T1, T2, T3, and T4.

In FIG. 13, the decoding process of one inter block mainly includes three steps:

First, parse/decode the MVs of the coding block and fetch the reference samples.

Second, generate the L0 and/or L1 prediction signals of the coding block.

Third, perform sample-wise refinement of the generated bi-prediction samples based on the BDOF when the coding block is predicted by one non-affine mode or the PROF when the coding block is predicted by affine mode.

As shown in FIG. 13, after the proposed harmonization method is applied, both the BDOF and the PROF are directly applied to the bi-prediction samples. Given that the BDOF and the PROF are applied to different types of coding blocks (i.e., the BDOF is applied to non-affine blocks, and the PROF is applied to the affine blocks), the two coding tools cannot be invoked simultaneously. Therefore, their corresponding decoding processes can be conducted by sharing the same pipeline stage. This is more efficient than the existing PROF design, where it is hard to assign the same pipeline stage for both the BDOF and the PROF due to their different workflow of bi-prediction.

In the above discussion, the proposed method only considers the harmonization of the workflows of the BDOF and the PROF. However, according to the existing designs, the basic operating unit for the two coding tools are also performed at different sizes. Specifically, for the BDOF, one coding block is split into multiple subblocks with a size of $W_s \times H_s$, where $W_s = \min(W, 16)$ and $H_s = \min(H, 16)$, where W and H are the width and the height of the coding block. The BODF operations, such as gradient calculation and sample refinement derivation, are performed independently for each subblock. On the other hand, as described earlier, an affine coding block is divided into 4×4 subblocks, with each subblock assigned one individual MV derived based on either 4-parameter or 6-parameter affine models. Because the PROF is only applied to the affine block, its basic operation unit is 4×4 subblock. Similar to the bi-prediction workflow problem, using different basic operating unit size for PROF from BDOF is also unfriendly for hardware implementations and makes it difficult for the BDOF and the PROF to share the same pipeline stage of the whole decoding process. In order to solve such an issue, in one embodiment, it is proposed to align the subblock size of the affine mode to be the same as that of the BDOF. Specifically, according to the proposed method, if one coding block is coded by affine mode, it will be split into subblocks with a size of $W_s \times H_s$, where $W_s = \min(W, 16)$ and $H_s = \min(H, 16)$, where W and H are the width and the height of the coding block. Each subblock is assigned one individual MV and considered as one independent PROF operating unit. It's worth mentioning that an independent PROF operating unit ensures that the PROF operation on top of it is performed without referencing the information from neighboring PROF operating units. Specifically, the PROF MV difference at one sample position is calculated as the difference between the MV at the sample position and the MV at the center of the PROF operating unit in which the sample is located; the gradients used by the PROF derivation are calculated by padding samples along each PROF operating unit. The asserted benefits of the proposed method mainly include the following aspects: 1) simplified pipeline architecture with unified basic operating unit size for both motion compensation and BDOF/PROF refinement; 2) reduced memory bandwidth usage due to the enlarged subblock size for affine motion compensation; 3) reduced per-sample computational complexity of fractional sample interpolation.

Because of the reduced computation complexity (i.e., item 3), with the proposed method, the existing 6-tap interpolation filter constraint for affine coding blocks can be removed. Instead, the default 8-tap interpolation for non-affine coding blocks is also used for affine coding blocks. The overall computational complexity, in this case, can still compare favorably against the existing PROF design that is based on a 4×4 subblock with a 6-tap interpolation filter.

Harmonization of Gradient Derivation for the BDOF and the PROF

As described earlier, both the BDOF and the PROF calculate the gradient of each sample inside the current coding block, which accesses one additional row/column of prediction samples on each side of the block. To avoid the additional interpolation complexity, the needed prediction samples in the extended region around the block boundary are directly copied from the integer reference samples. However, as pointed out in the section "problem statement," the integer samples at different locations are used to calculate the gradient values of the BDOF and the PROF.

To achieve one more uniform design, two methods are disclosed in the following to unify the gradient derivation methods used by the BDOF and the PROF. In the first method, it is proposed to align the gradient derivation method of the PROF to be the same as that of the BDOF. Specifically, by the first method, the integer position used to generate the prediction samples in the extended region is determined by flooring down the fractional sample position, i.e., the selected integer sample position is located left to the fractional sample position (for horizontal gradients) and above the fractional sample position (for vertical gradients).

In the second method, it is proposed to align the gradient derivation method of the BDOF to be the same as that of the PROF. In more detail, when the second method is applied, the integer reference sample that is closest to the prediction sample is used for gradient calculations.

Figure 14:
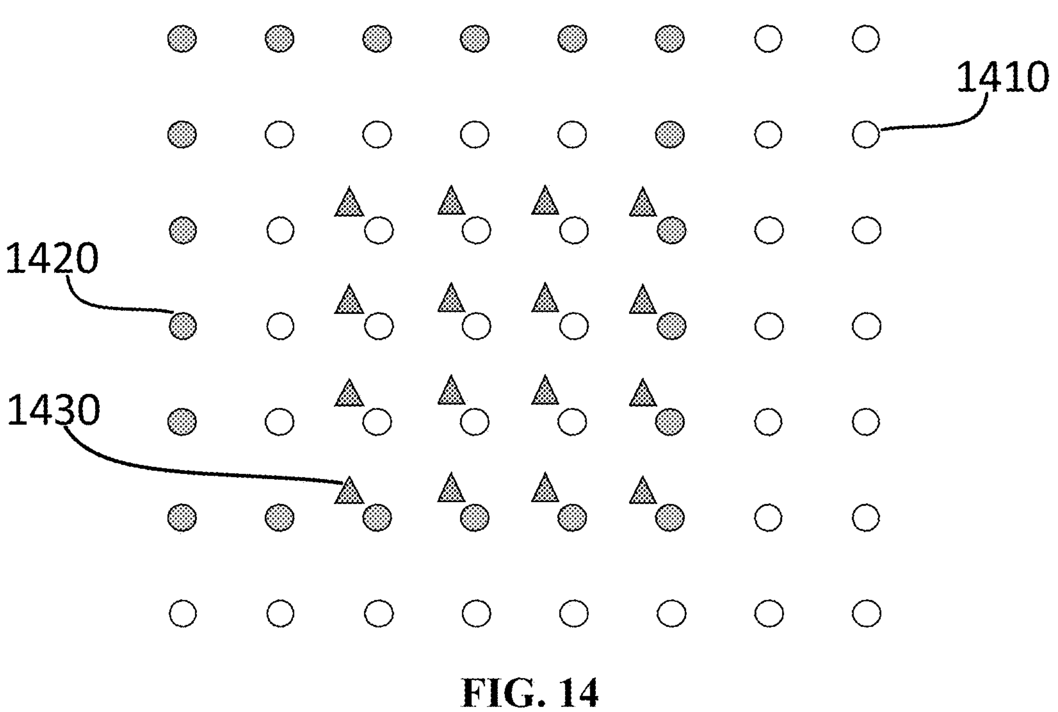
FIG. 14 is an illustration of a gradient derivation method of a BDOF, according to the present disclosure.

FIG. 14 shows an example of using the gradient derivation method of the BDOF, where blank circles represent reference samples 1410 at integer positions, triangles represent the fractional prediction samples 1430 of the current block, and gray circles represent the integer reference samples 1420 that are used to fill the extended region of the current block.

Figure 15:
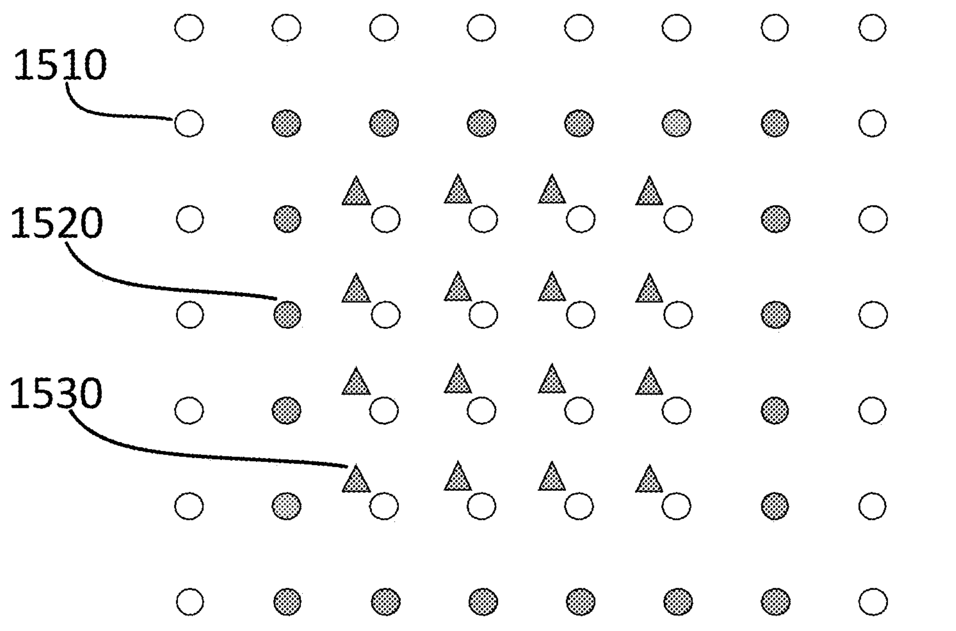
FIG. 15 is an illustration of a gradient derivation method of a PROF, according to the present disclosure.

FIG. 15 shows an example of using the gradient derivation method of the PROF, where blank circles represent reference samples 1510 at integer positions, triangles represent the fractional prediction samples 1530 of the current block, and gray circles represent the integer reference samples 1520 that are used to fill the extended region of the current block.

FIG. 14 and FIG. 15 illustrate the corresponding integer sample locations that are used for the derivation of the gradients for the BDOF and the PROF when the first method (FIG. 14) and the second method (FIG. 15) are applied, respectively. In FIGS. 14 and 15, the blank circles represent reference samples at integer positions, triangles represent the fractional prediction samples of the current block, and gray circles represent the integer reference samples that are used to fill the extended region of the current block for gradient derivation.

Early Termination of the PROF Based on Control-Point MV Difference

According to the current PROF design, the PROF is always invoked when one coding block is predicted by the affine mode. However, as indicated in equations (6) and (7), the subblock MVs of one affine block is derived from the control-point MVs. Therefore, when the differences between the control-point MVs are relatively small, the MVs at each sample position should be consistent. In such a case, the benefit of applying the PROF could be very limited. Therefore, to further reduce the average computational complexity of the PROF, it is proposed to adaptively skip the PROF based sample refinement based on the maximum MV difference between the sample-wise MV and the subblock-wise MV within one 4×4 subblock. Because the values of the PROF MV difference of the samples inside one 4×4 subblock are symmetric about the subblock center, the maximum horizontal and vertical PROF MV difference can be calculated based on the equation (10) as $$\Delta v_x^{max} = 6*(c+d) \qquad \Delta v_y^{max} = 6*(e+f) \tag{14}$$

According to the current disclosure, different metrics may be used in determining if the MV difference is small enough to skip the PROF process.

In one example, based on the equation (14), the PROF process can be skipped when the sum of the absolute maximal horizontal MV difference and the absolute maximal vertical MV difference is smaller than one predefined threshold, i.e., $$|\Delta v_x^{max}| + |\Delta v_y^{max}| \leq thres \tag{15}$$

In another example, if the maximum value of $$|\Delta v_x^{max}| \text{ and } |\Delta v_y^{max}|$$

is not larger than a threshold, the PROF process can be skipped.

$$\mathrm{MAX}(|\Delta v_x^{max}|, |\Delta v_y^{max}|) \leq thres \tag{16}$$

MAX(a, b) is a function that returns the larger value between input values a and b.

In addition to the two examples above, the spirit of the current disclosure is also applicable to the cases when other metrics are used in determining if the MV difference is small enough for skipping the PROF process.

In the above method, the PROF is skipped based on the magnitude of the MV difference. On the other hand, in addition to the MV difference, the PROF sample refinement is also calculated based on the local gradient information at each sample location in one motion compensated block. For prediction blocks that contain less high-frequency details (e.g., the flat area), the gradient values tend to be small such that the values of the derived sample refinements should be small. Taking this into consideration, according to another aspect of the current disclosure, it is proposed to only apply the PROF to the predication samples of the blocks, which contain enough high-frequency information.

Different metrics may be used in determining if a block contains enough high-frequency information so that the PROF process is worth to be invoked for the block. In one example, the decision is made based on the average magnitude (i.e., absolute value) of the gradients of the samples within the prediction block. If the average magnitude is smaller than one threshold, then the prediction block is classified as flat area, and the PROF should not be applied; otherwise, the prediction block is considered to contain sufficient high-frequency details where the PROF is still applicable. In another example, the maximum magnitude of the gradients of the samples within the prediction block may be used. If the maximum magnitude is smaller than one threshold, PROF is to be skipped for the block. In yet another example, the difference between the maximum sample value and the minimum sample value, $I_{max}-I_{min}$, of a prediction block may be used to determine if PROF is to be applied to the block. If such a difference value is smaller than a threshold, PROF is to be skipped for the block. It is worth noting that the spirit of the disclosure is also applicable to the cases where some other metrics are used in determining if a given block contains enough high-frequency information or not.

Figure 16:
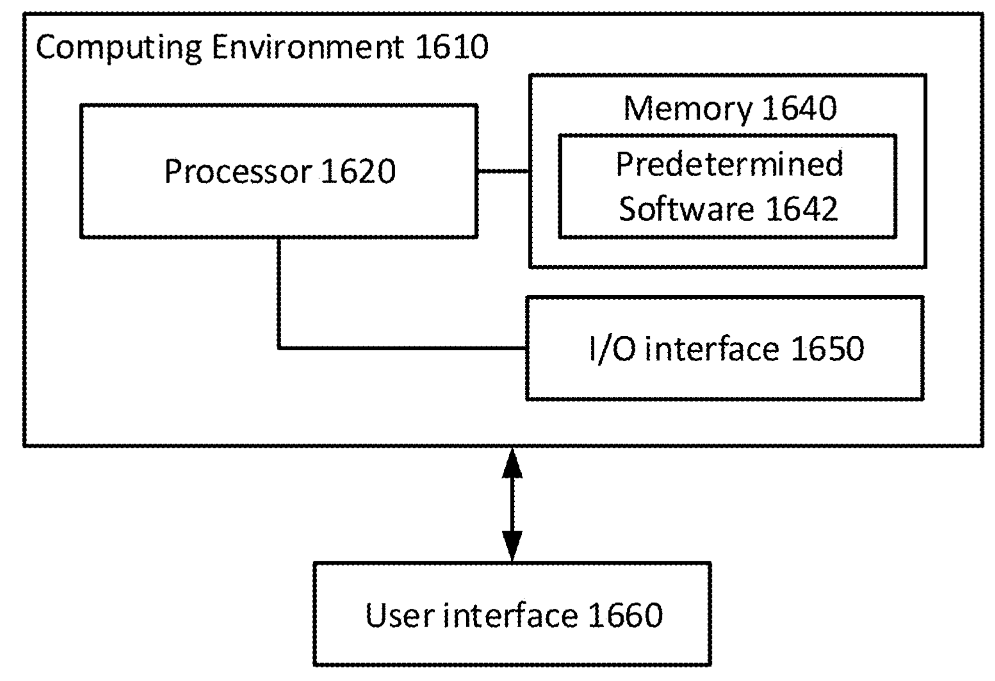
FIG. 16 is a diagram illustrating a computing environment coupled with a user interface, according to an example of the present disclosure.

FIG. 16 shows a computing environment 1610 coupled with a user interface 1660. The computing environment 1610 can be part of a data processing server. The computing environment 1610 includes processor 1620, memory 1640, and I/O interface 1650.

The processor 1620 typically controls overall operations of the computing environment 1610, such as the operations associated with the display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a GPU, or the like.

The memory 1640 is configured to store various types of data to support the operation of the computing environment 1610. Memory 1640 may include predetermine software 1642. Examples of such data includes instructions for any applications or methods operated on the computing environment 1610, video datasets, image data, etc. The memory 1640 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1650 provides an interface between the processor 1620 and peripheral interface modules, such as a keyboard, a click wheel, buttons, and the like. The buttons may include but are not limited to, a home button, a start scan button, and a stop scan button. The I/O interface 1650 can be coupled with an encoder and decoder.

In an embodiment, there is also provided a non-transitory computer-readable storage medium comprising a plurality of programs, such as comprised in the memory 1640, executable by the processor 1620 in the computing environment 1610, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In an embodiment, the computing environment 1610 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for encoding a video signal, comprising:

obtaining a first reference picture associated with a video block in a current picture within the video signal and a first motion vector (MV) from the video block in the current picture to a reference block in the first reference picture, wherein the first reference picture comprises multiple non-overlapped video blocks and at least one video block is associated with at least one MV;

obtaining first prediction samples I (i, j) of the video block generated from the reference block in the first reference picture, wherein i and j represent a coordinate of one sample within the video block;

controlling internal bit-depths of internal prediction refinement with optical flow (PROF) parameters, wherein the internal PROF parameters comprise a horizontal gradient value, a vertical gradient value, a horizontal motion difference, and a vertical motion difference derived for a first prediction sample I (i, j);

obtaining a prediction refinement value for the first prediction sample I (i, j) based on the horizontal and vertical gradient values and the horizontal and vertical motion differences;

obtaining second prediction samples I' (i, j) associated with a second MV and a corresponding prediction refinement value for a second prediction sample I' (i, j); and obtaining a final prediction sample of the video block based on the first prediction sample I (i, j), the second prediction sample I' (i, j), and the prediction refinement values.

2. The method of claim 1, wherein controlling the internal bit-depths of the internal PROF parameters comprises, for one sample in the video block:

obtaining a horizontal gradient value based on prediction samples of two samples adjacent to said one sample in a horizontal direction and a first shift value; and obtaining a vertical gradient value based on prediction samples of two samples adjacent to said one sample in a vertical direction and the first shift value.

3. The method of claim 2, further comprising, for said one sample in the video block:

obtaining control point MVs of a coding block which contains the video block, wherein the control point MVs comprises MVs of top-left, top-right, and bottom-left corner blocks of the coding block;

obtaining affine model parameters derived based on the control point MVs;

obtaining a horizontal MV difference $\Delta v_x$ (i, j) and a vertical MV difference $\Delta v_y$ (i, j) based on the affine parameters, the horizontal offset, and the vertical offset;

right shifting the horizontal MV difference $\Delta v_x$ (i, j) by a second shift value; and right shifting the vertical MV difference $\Delta v_y$ (i, j) by the second shift value.

4. The method of claim 2, wherein obtaining the horizontal and vertical gradient values of the first prediction sample I (i, j) further comprises:

deriving an additional row or column of prediction samples outside the video block which is adjacent to each of top, left, bottom and right boundaries of the video block for the first prediction samples I (i, j).

5. The method of claim 4, wherein deriving the additional row or column of the prediction samples further comprises:

deriving prediction samples outside the video block which are adjacent to the left and right boundaries from integer reference samples in the first reference picture that are closest to respective fractional sample positions in a horizontal direction; and deriving prediction samples outside the video block which are adjacent to the top and bottom boundaries from integer reference samples in the first reference picture that are closest to the respective fractional sample positions in a vertical direction.

6. The method of claim 1, wherein a value of a coding bit-depth is equal to 12.

7. The method of claim 1, wherein a value of a coding bit-depth is greater than 12.

8. A computing device, comprising:

one or more processors; and a non-transitory computer-readable storage medium storing instructions executable by the one or more processors, wherein the one or more processors are configured to:

obtain a first reference picture associated with a video block in a current picture within the video signal and a first motion vector (MV) from the video block in the current picture to a reference block in the first reference picture, wherein the first reference picture comprises multiple non-overlapped video blocks and at least one video block is associated with at least one MV;

obtain first prediction samples I (i, j) of the video block generated from the reference block in the first reference picture;

control internal bit-depths of internal prediction refinement with optical flow (PROF) parameters, wherein the internal PROF parameters comprise a horizontal gradient value, a vertical gradient value, a horizontal motion difference, and a vertical motion difference derived for a first prediction sample I (i, j);

obtain a prediction refinement value for the first prediction sample I (i, j) based on the horizontal and vertical gradient values and the horizontal and vertical motion differences;

obtain second prediction samples I' (i, j) associated with a second MV and a corresponding prediction refinement value for a second prediction sample I' (i, j); and obtain a final prediction sample of the video block based on the first prediction sample I (i, j), the second prediction sample I' (i, j), and the prediction refinement values.

9. The computing device of claim 8, wherein the one or more processors configured to control the internal bit-depths of the internal PROF parameters are further configured to, for one sample in the video block:

obtain a horizontal gradient value based on prediction samples of two samples adjacent to said one sample in a horizontal direction and a first shift value; and obtain a vertical gradient value based on prediction samples of two samples adjacent to respective fractional sample positions in a horizontal direction; and derive prediction samples outside the video block which are adjacent to the top and bottom boundaries from integer reference samples in the first reference picture that are closest to the respective fractional sample positions in a vertical direction.

10. The computing device of claim 9, wherein the one or more processors are further configured to, for said one sample in the video block:

obtain control point MVs of a coding block which contains the video block, wherein the control point MVs comprises MVs of top-left, top-right, and bottom-left corner blocks of the coding block;

obtain affine model parameters derived based on the control point MVs obtain a horizontal MV difference $\Delta v_x$ (i, j) and a vertical MV difference $\Delta v_y$ (i, j) based on the affine parameters, the horizontal offset, and the vertical offset;

right shift the horizontal MV difference $\Delta v_x$ (i, j) by a second shift value; and right shift the vertical MV difference $\Delta v_y$ (i, j) by the second shift value.

11. The computing device of claim 9, wherein the one or more processors configured to obtain the horizontal and vertical gradient values of the first prediction sample I (i, j) are further configured to:

derive an additional row or column of prediction samples outside the video block which is adjacent to each of top, left, bottom and right boundaries of the video block for the first prediction samples I (i, j).

12. The computing device of claim 11, wherein the one or more processors configured to derive the additional row or column of the prediction samples are further configured to:

derive prediction samples outside the video block which are adjacent to the left and right boundaries from integer reference samples in the first reference picture that are closest to said one sample in a vertical direction and the first shift value.

13. The computing device of claim 8, wherein a value of a coding bit-depth is equal to 12.

14. The computing device of claim 8, wherein a value of a coding bit-depth is greater than 12.

15. A non-transitory computer readable storage medium comprising a bitstream generated by a method for encoding a video signal comprising:

obtaining a first reference picture associated with a video block in a current picture within the video signal and a first motion vector (MV) from the video block in the current picture to a reference block in the first reference picture, wherein the first reference picture comprises multiple non-overlapped video blocks and at least one video block is associated with at least one MV;

obtaining first prediction samples I (i, j) of the video block generated from the reference block in the first reference picture, wherein i and j represent a coordinate of one sample within the video block;

controlling internal bit-depths of internal prediction refinement with optical flow (PROF) parameters, wherein the internal PROF parameters comprise a horizontal gradient value, a vertical gradient value, a horizontal motion difference, and a vertical motion difference derived for a first prediction sample I (i, j);

obtaining a prediction refinement value for the first prediction sample I (i, j) based on the horizontal and vertical gradient values and the horizontal and vertical motion differences;

obtaining second prediction samples I' (i, j) associated with a second MV and a corresponding prediction refinement value for a second prediction sample I' (i, j); and obtaining a final prediction sample of the video block based on the first prediction sample I (i, j), the second prediction sample I' (i, j), and the prediction refinement values.

16. The non-transitory computer readable storage medium of claim 15, wherein a value of a coding bit-depth is equal to 12.

17. The non-transitory computer readable storage medium of claim 15, wherein a value of a coding bit-depth is greater than 12.

18. A method for storing a bitstream, comprising:

generating a bitstream by performing the method of claim 1; and storing the bitstream.

19. The method of claim 18, wherein a value of a coding bit-depth is equal to 12.

20. The method of claim 18, wherein a value of a coding bit-depth is greater than 12.

* * * * *